US010058928B2

(12) United States Patent  
Timpson

(10) Patent No.: US 10,058,928 B2  
(45) Date of Patent: Aug. 28, 2018

(54) PORTABLE HANDHELD DRILL PRESS

(71) Applicant: Carl Timpson, Hildale, UT (US)

(72) Inventor: Carl Timpson, Hildale, UT (US)

( * ) Notice: Subject to any disclaimer, the term of this patent is extended or adjusted under 35 U.S.C. 154(b) by 0 days.

(21) Appl. No.: 14/671,756

(22) Filed: Mar. 27, 2015

(65) Prior Publication Data

US 2015/0273594 A1    Oct. 1, 2015

Related U.S. Application Data

(60) Provisional application No. 61/971,193, filed on Mar. 27, 2014.

(51) Int. Cl.
| | |
|---|---|
| *B23B 45/14* | (2006.01) |
| *B23B 45/00* | (2006.01) |
| *B25H 1/00* | (2006.01) |
| *B23B 45/12* | (2006.01) |

(52) U.S. Cl.
CPC ........... *B23B 45/008* (2013.01); *B23B 45/00* (2013.01); *B25H 1/0021* (2013.01); *B23B 45/12* (2013.01); *Y10T 408/494* (2015.01); *Y10T 408/6779* (2015.01); *Y10T 408/6786* (2015.01)

(58) Field of Classification Search
CPC ....... B23B 45/008; B23B 45/12; B23B 45/00; B23B 45/14; B23Q 5/385; B23Q 5/50; B25H 1/0021; B25H 1/0064; Y10T 408/488; Y10T 408/494; Y10T 408/6786; Y10T 408/6779

See application file for complete search history.

(56) References Cited

U.S. PATENT DOCUMENTS

| | | | | |
|---|---|---|---|---|
| 1,352,646 A | * | 9/1920 | Baltzley | B25H 1/0057 408/95 |
| 1,362,914 A | * | 12/1920 | Baltzley | B25H 1/0057 408/99 |
| 1,362,915 A | * | 12/1920 | Baltzley | B25H 1/0064 408/130 |
| 1,838,995 A | * | 12/1931 | Johnson et al. | 408/135 |
| 3,250,153 A | * | 5/1966 | Purkey | B25H 1/0057 408/100 |
| 3,456,738 A | * | 7/1969 | Harry | B25H 1/0042 173/18 |
| 3,538,794 A | * | 11/1970 | Grundmeyer | B25H 1/0057 408/92 |

(Continued)

FOREIGN PATENT DOCUMENTS

| | | | | |
|---|---|---|---|---|
| DE | 2650507 A1 | * | 5/1978 | ........... B25H 1/0064 |
| DE | 3423390 A1 | * | 1/1986 | ............... B23Q 1/26 |

(Continued)

*Primary Examiner* — Nicole N Ramos  
(74) *Attorney, Agent, or Firm* — Gurr & Brande, PLLC; Robert A. Gurr

(57) ABSTRACT

A handheld drill press device includes a spine with a longitudinal section having a geared rack located thereon and a transverse section configured to receive and be coupled to a handheld drill. A carriage frame is slidably coupled to the spine and includes a workpiece connection interface located about the carriage. A gear and a lever handle are both rotatably coupled to the carriage frame wherein the gear is operable to mesh with the geared rack and the lever is configured to provide a torque to the gear and thereby move the carriage frame with respect to the spine.

5 Claims, 8 Drawing Sheets

DETAIL A

(56) References Cited

U.S. PATENT DOCUMENTS

| | | | | |
|---|---|---|---|---|
| 3,667,855 | A | * | 6/1972 | Allan .................. B25H 1/0064 408/114 |
| 4,284,373 | A | * | 8/1981 | Wolff ............................ 408/87 |
| 4,494,895 | A | * | 1/1985 | Leaf .................... B25H 1/0064 408/236 |
| 5,102,270 | A | | 4/1992 | Warren |
| 5,413,440 | A | * | 5/1995 | Willson .................. B23Q 1/28 408/111 |
| 6,692,201 | B2 | * | 2/2004 | Soderman ............ B25H 1/0064 408/111 |
| 8,142,114 | B2 | * | 3/2012 | Fuchs et al. .................. 408/135 |
| 8,622,664 | B2 | | 1/2014 | Lanser |
| 2003/0143041 | A1 | | 7/2003 | Soderman |
| 2004/0070132 | A1 | | 4/2004 | Varzino et al. |
| 2005/0152756 | A1 | * | 7/2005 | Howard ........................ 408/103 |
| 2007/0081869 | A1 | * | 4/2007 | Glodowski .......... B25H 1/0064 408/110 |
| 2009/0162158 | A1 | * | 6/2009 | Glodowski .......... B25H 1/0021 408/136 |
| 2014/0169897 | A1 | * | 6/2014 | Vuckovic ................ B23B 47/26 408/1 R |
| 2015/0030403 | A1 | * | 1/2015 | Nowland ................ B25H 1/10 408/100 |

FOREIGN PATENT DOCUMENTS

| | | | | |
|---|---|---|---|---|
| DE | 29505693 U1 | * | 7/1996 | ........... B25H 1/0064 |
| DE | 202014100357 U1 | * | 4/2014 | ........... B25H 1/0021 |
| FR | 1376701 A | * | 10/1964 | ............... B23Q 5/50 |
| WO | WO 2008130283 A1 | * | 10/2008 | ........... B25H 1/0064 |

* cited by examiner

DETAIL A

DETAIL B

DETAIL C

DETAIL D

PORTABLE HANDHELD DRILL PRESS

CROSS-REFERENCE TO RELATED APPLICATIONS

This application claims the benefit of U.S. Provisional Application Ser. No. 61/971,193, filed on Mar. 27, 2014, which is incorporated herein by reference.

TECHNICAL FIELD

The present disclosure relates generally to handheld power tools. More particularly, the present disclosure relates to handheld drills and related devices and methods for ensuring that consistent and straight holes are drilled.

BACKGROUND

It has been recognized that drill presses which can securely hold a workpiece and move a drill bit in a precise and accurate axial fashion are extremely useful when drilling precisely located holes and ensuring that the holes form straight and nearly perfect cylinders. It should be appreciated that such precise drilling may be required in remote locations, or that it may be required to form such holes in particularly large workpieces which are not capable of being transported to a machine shop that typically includes an appropriate conventional shop-sized drill press. Additionally, typical shop-sized drill presses would be particularly burdensome to transport to a work site, particularly when only a few such operations might be needed. It has therefore been recognized that a portable handheld drill press would be desirable. Such a press can fit into a standard sized toolbox, accept a wide variety of standard size bits, and still allow for precise movements of the handheld drill with respect to the workpiece.

The prior art has attempted to solve this need, but still has several shortcomings. For example, in the prior art, drills are movable on the spine (also referred to as a rackbar), which can create unwanted twisting of other rotational movement of the drill. Further, drills in the prior art are mounted closely to the spine, which limits their ability to be used in a variety of circumstances.

As such, there is a need for a portable handheld drill press that restricts rotational movement of the drill and that is also capable of drilling at a distance from the spine while maintaining a clamping ability.

SUMMARY OF EXAMPLE EMBODIMENTS

It has been recognized that it would be advantageous to develop a handheld drill press that can be easily transported and quickly employed in locations remote from a machine shop.

In one embodiment a handheld drill press device comprises a spine, the spine being provided with a longitudinal section having a geared rack located thereon and a transverse section configured to receive a handheld drill. Additionally, a carriage frame is provided which may be slidably coupled to the spine. The carriage has a workpiece-securing interface located about the carriage for holding a workpiece to be drilled. The carriage frame is further provided with a gear which is rotatably coupled to the carriage frame and operable to mesh with the geared rack. A lever handle is provided on the carriage frame which is configured to provide a torque to the gear and thereby move the carriage frame with respect to the spine.

In another embodiment, a system includes a portable handheld drill press device having a spine. The spine is provided with two sections, one being a longitudinal section and second section being a transverse section. A drill connection interface is provided about a distal end of the transverse section, the drill connection interface being removably coupled to the transverse section of the spine. Additionally, the drill connection interface is configured to receive a drill end of a handheld drill. A rack is provided on the spine, the rack having a plurality of geared teeth. The rack is coupled to an exterior surface of the longitudinal section of the spine. The exterior surface being located on an opposing side of the spine from the direction in which the transverse section extends. A carriage frame is provided which is movably coupled to and circumventing the longitudinal section of the spine; i.e., the spine travels through the carriage frame. A workpiece connection interface is provided on the carriage frame, the workpiece connection interface being removably coupled to a distal end of the carriage frame. The workpiece connection interface extends in the same direction relative to the spine as the transverse section, and is configured to receive a workpiece to be worked upon by the handheld drill. A gear is coupled to the carriage frame which has a plurality of gear teeth which are configured to mesh with the plurality of geared teeth of the rack. A lever handle is rotatably coupled to the carriage frame about the gear, and a ratcheting mechanism is coupled to a lever handle. The handle and ratcheting mechanism are configured such that application of a force about the end of the lever handle causes the ratcheting mechanism to engage the gear thus causing the gear to rotate and therefore displace the carriage frame with respect to the spine.

DETAILED DESCRIPTION OF EXAMPLE EMBODIMENT(S)

The following descriptions depict only example embodiments and are not to be considered limiting of its scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to any included drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various different sequences and arrangements while still falling within the scope of the present invention.

Figure 1:
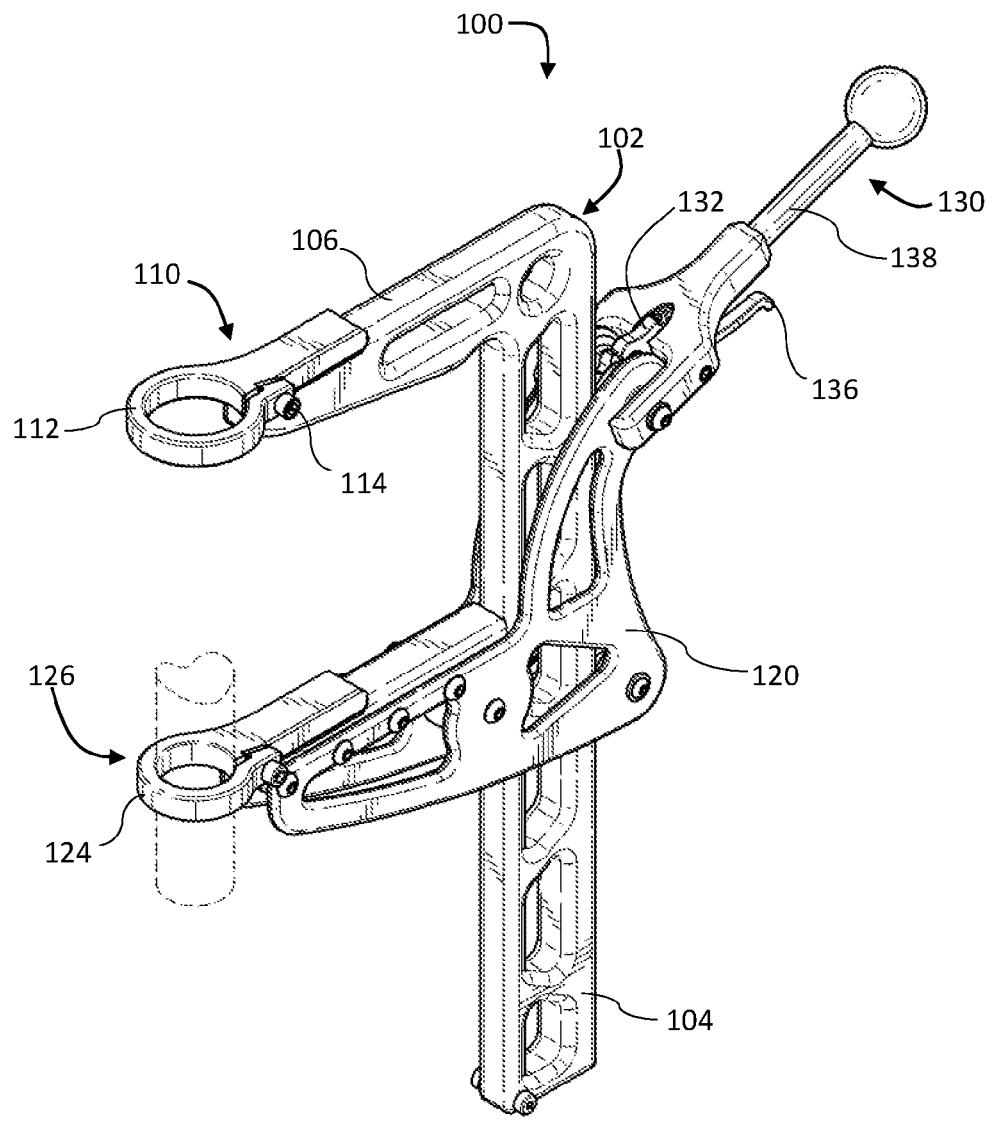
FIG. 1 is a perspective view of a portable handheld drill press
Figure 2:
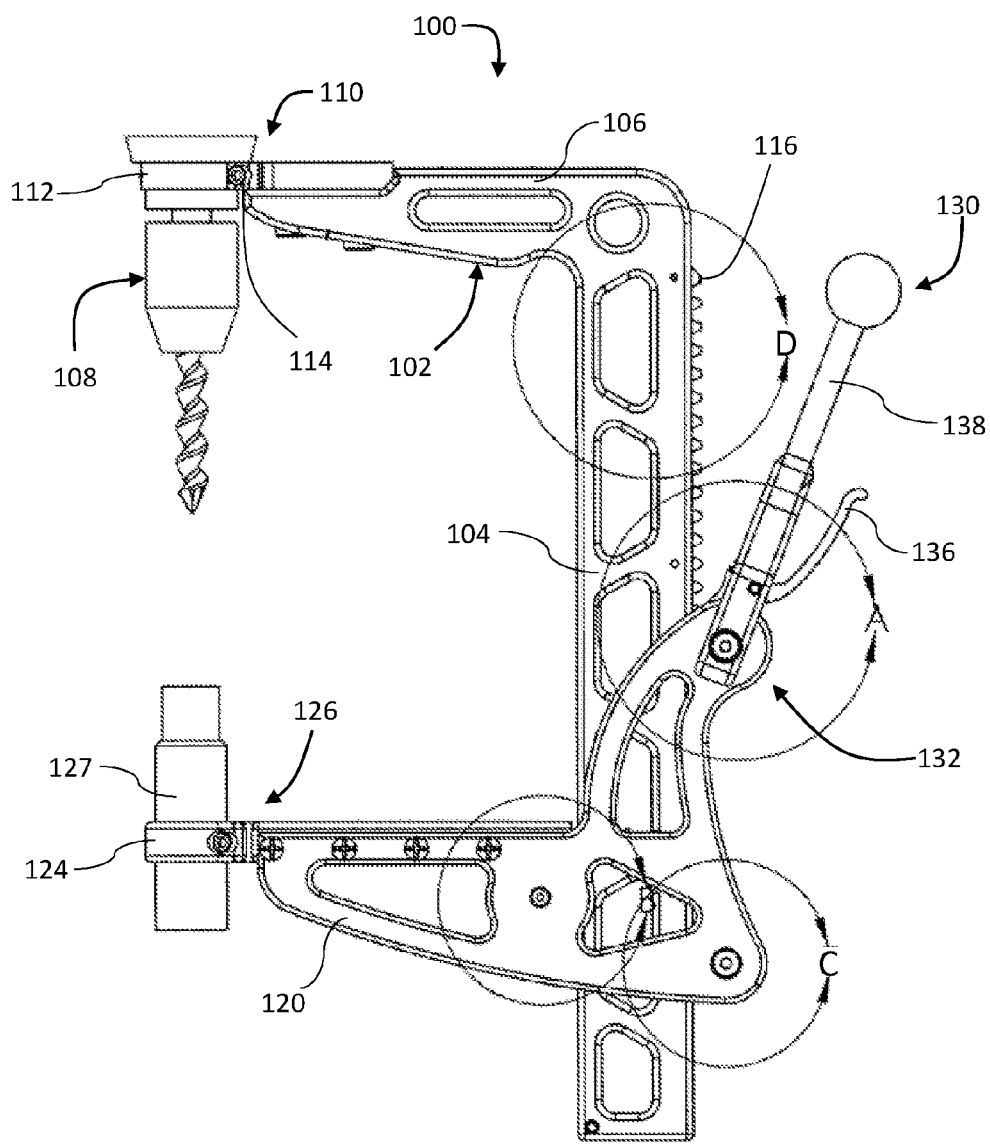
FIG. 2 is a side elevation view of a portable handheld drill press

A portable handheld drill press in accordance with the present technology is illustrated in FIGS. 1-6. The portable handheld drill press system, indicated generally at 100, includes a spine 102 having a longitudinal component or section 104 and a transverse component or section 106. As shown in FIG. 2, the transverse section 106 is capable of receiving a standard handheld drill 108 about a distal end 110. It should be appreciated that, in the interest of clarity, only a small portion of the rigid body of the drill 108 is shown, as well as the rotating chuck. The portable handheld drill 108 may be of any variety, either cordless or plug-in. The rotating chuck may be configured to receive a variety of drill bits or drivers and be capable of drilling, screwing or performing any function typically associated with a normal handheld drill.

The transverse section 106 of the spine 102 has a drill connection interface 112 located about the distal end 110 of the transverse section 106. The drill connection interface 112 is capable of receiving the drill 108 in a variety of methods. One such method, as shown, may include a circular ring clamp which may clamp onto the drill 108 above the rotating chuck, so as to not interfere with the rotation of the rotating chuck. It should be appreciated that the ring clamp may be provided with a clamping bolt 114 which pinches the ring and thus securely holds the rigid body of the drill 108. It should be appreciated that drill connection interface 112 is modular and may have a plurality of different shapes and contours which may be separately customizable to particular drill brands and types.

Figure 2A:
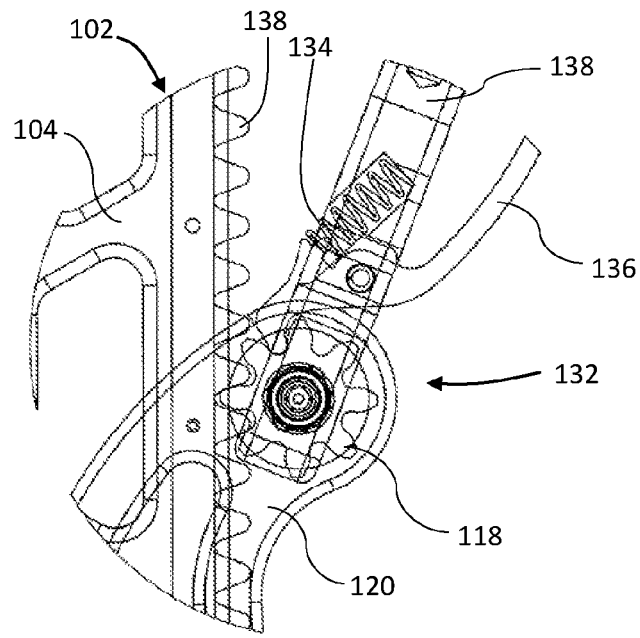
FIG. 2A is a detailed view a ratcheting mechanism with the pinion gear meshing with the gear rack

The longitudinal section 104 of the spine 102 is provided with a geared rack 116. The geared rack 116 functions as the rack in a rack and pinion type system, which will be discussed herein in more detail below. The geared rack 116 has a plurality of geared teeth extending from the surface thereof. The rack 116 is located on the spine 102 on an exterior surface so as to be exposed in order to mesh and engage the pinion gear 118, as best seen in FIG. 2A. The exterior surface onto which the geared rack 116 is provided may preferably be on the exterior surface of the spine 102 which is opposite the direction in which the transverse section 106 extends. In other words, the geared rack 116 will be located on an opposing side from the drill 108 when in operation.

A moveable carriage frame 120 may also be provided wherein the spine 102 may pass through a central portion of the carriage frame 120 such that the carriage frame 120 circumvents or encloses the spine 102. The carriage frame 120 is configured so as to be slidably disposed about longitudinal section 104 of the spine 102. The carriage frame 120 may be provided with a pinion gear 118 about a proximal end and configured such that the pinion gear 118 has teeth which mesh with the geared teeth of the rack 116. As such, the rotation of the pinion gear 118 will cause a longitudinal translation of the carriage frame 120 with respect to the spine 102.

In one embodiment, a workpiece connection interface 124 may be provided on a distal end 126 of the carriage frame 120. The distal end 126 of the carriage frame 120 can extend in a common radial direction from longitudinal section 104 of the spine 102 as the distal end 110 of the transverse section 106. In this manner, rotation of the pinion gear 118 causes a translation of the carriage frame 120 along the longitudinal section 104 of the spine 102. Such a translation may then cause the workpiece connection interface 124 to be brought closer to the drill 108 installed in the drill connection interface 112. In this manner, a workpiece on or coupled to the workpiece connection interface 124 may be caused to be engaged by the drill 108 in a precise direction being coaxial with the drill bit and thereby allow for precise drilling of the workpiece.

Figure 2B:
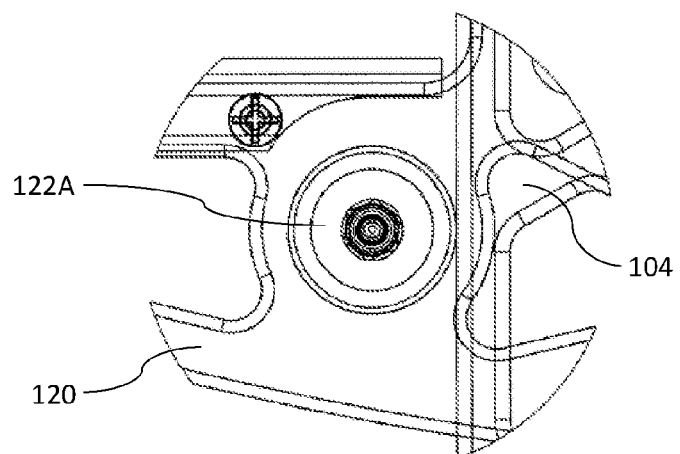
FIG. 2B is a detailed view of an inner wheel of a portable handheld drill press
Figure 2C:
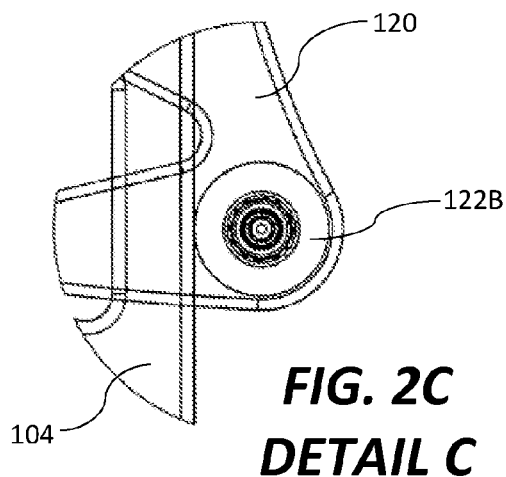
FIG. 2C is a detailed view of an outer wheel of a portable handheld drill press
Figure 2D:
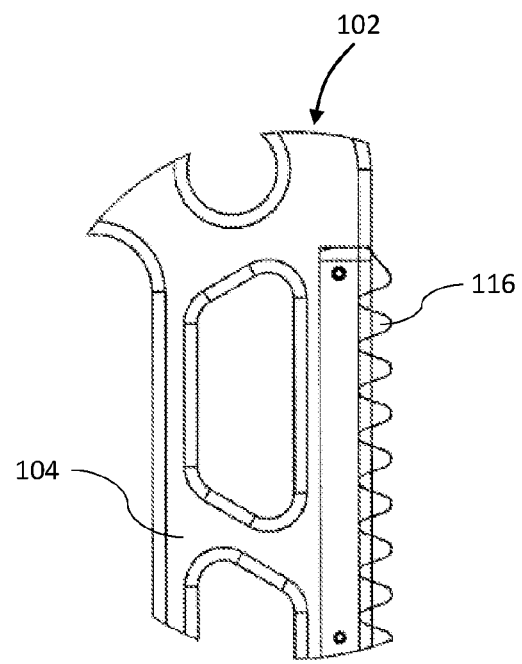
FIG. 2D is a detailed view of a removable geared rack of a portable handheld drill press
Figure 3:
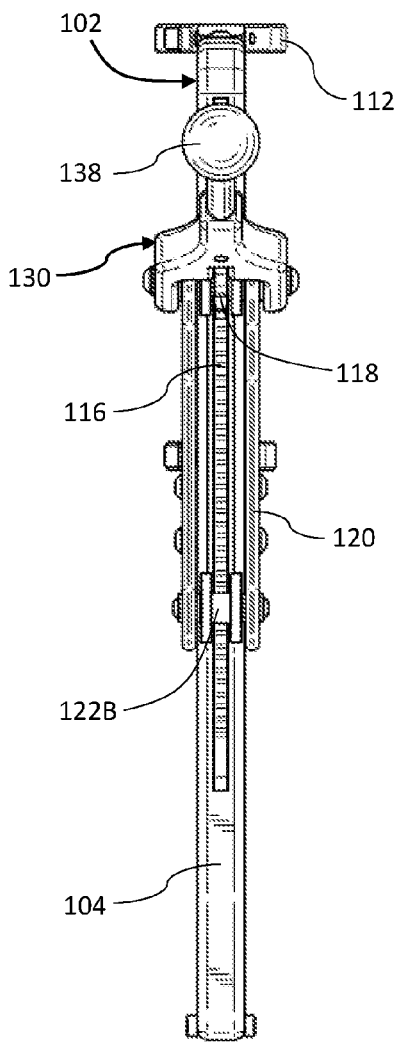
FIG. 3 is a back elevation view of a portable handheld drill press
Figure 4:
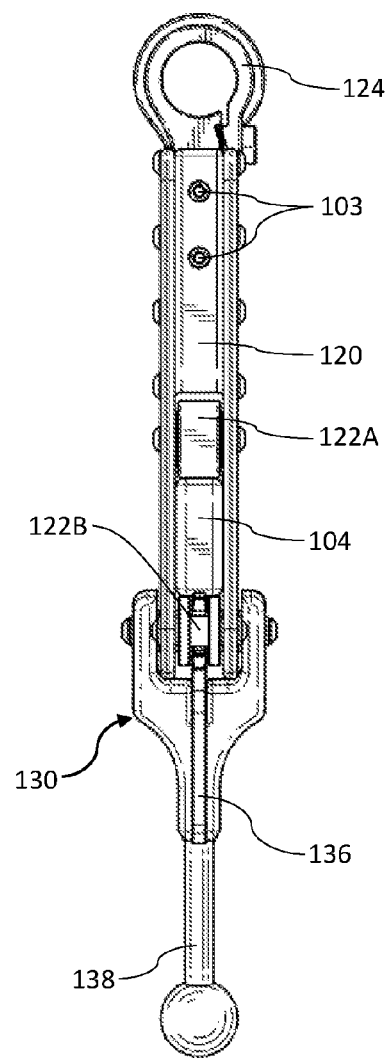
FIG. 4 is a bottom plan view of a portable handheld drill press
Figure 5:
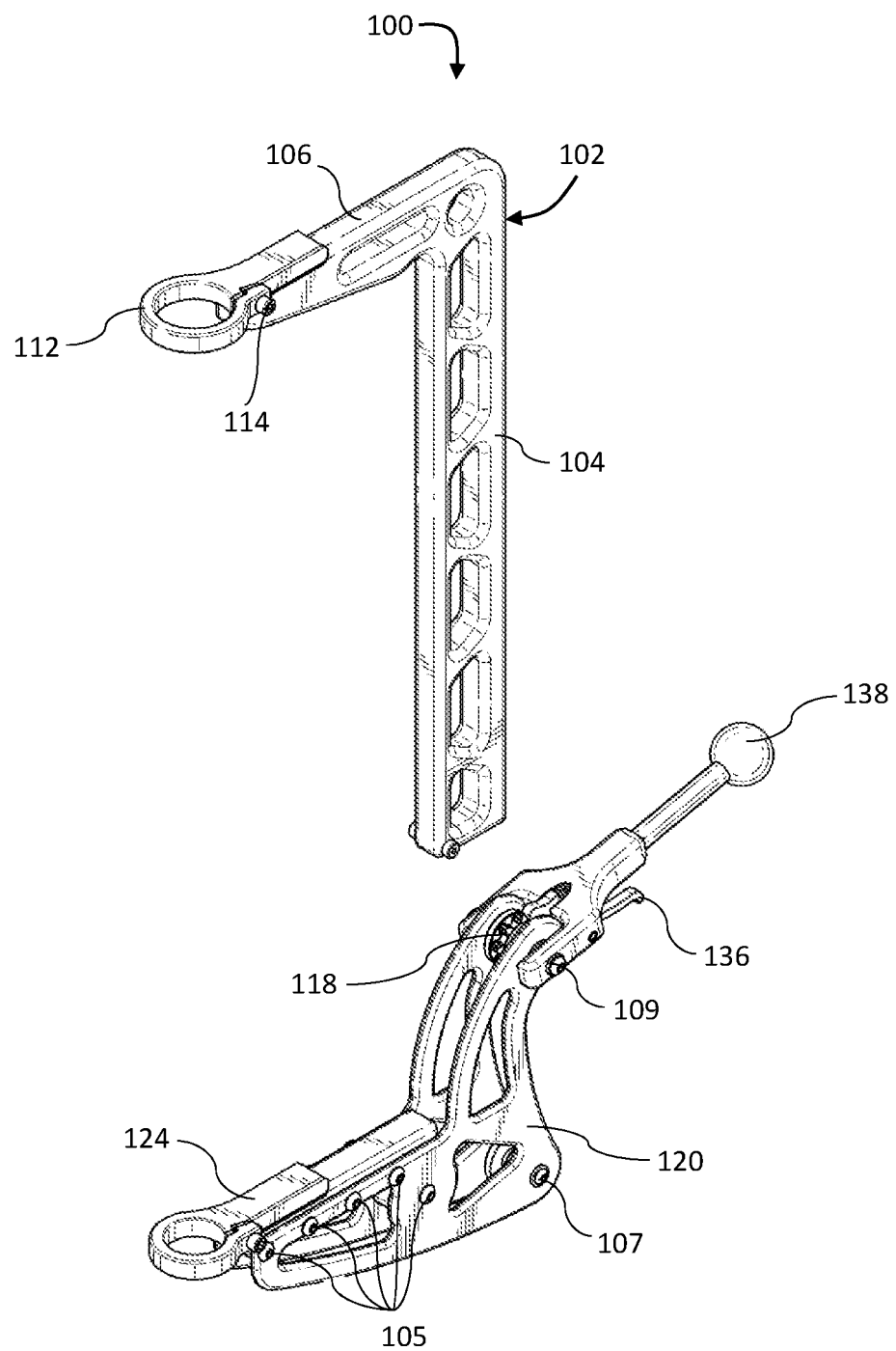
FIG. 5 is disassembled view of a portable handheld drill press

In order to ensure more precise and fluid movements of the carriage frame 120 with respect to the spine 102, the carriage frame 120 may be provided with one or more roller wheels 122A, 122B, as best seen in FIGS. 2B and 2C. The roller wheels 122A, 122B may be disposed on opposing sides of the spine 102 such that they create a precise slot through the carriage frame 120 through which the longitudinal section 104 of the spine 102 may slide. In this manner the degrees of freedom between the spine 102 and the carriage frame 120 may be limited to only a translational motion and eliminate any relative twist, which is an improvement over the prior art. The wheels 122A and 122B further relieve undue pressure on the pinion gear 118 with rack 116, thereby lessening the wear on those components and extending the life of the same. Further, the wheels 122A and 122B also allow the ratcheting mechanism 132 to be more fluid and help prevent grinding of the gear 118 on the rack 116.

The longitudinal section 104 of the spine 102 may have hardened and smooth surfaces located below the geared rack 116 which provide for smooth translational motion.

The carriage frame 120 may also be provided with a lever 130 which may be free to rotate with respect to the carriage frame 120. Rotation of the lever 130 with respect to the carriage frame 120 may be configured so as to impart rotation to the pinion gear 118. As discussed above, rotation of the pinion gear 118 when the gear teeth of the pinion gear 118 are meshed with the gear teeth of the geared rack 116 results in a translation of the carriage frame along the longitudinal section 104 of the spine 102. In one embodiment, the lever 130 may be directly coupled to the rotating pinion gear 118; however, a direct coupling may result in a limited degree of translational motion. Therefore, in one embodiment, as shown in FIG. 2A, in order to provide additional movement range, a ratcheting mechanism 132 may be provided as an intermediate actuator between the lever 130 and the pinion gear 118.

The ratcheting mechanism 132 may be spring loaded, via spring 134 and configured so as to lock the relative position of the lever 130 to the pinion gear 118. In such a configuration the ratchet lever 136 may be utilized to release the ratcheting mechanism 132 from the pinion gear 118 thus allowing the lever 130 to freely rotate back to an original position wherein the lever 130 and ratcheting mechanism 132 may reengage the pinion gear 118 again and be pushed farther; the process can be repeated to achieve the desired relative translation.

Alternatively, the ratcheting mechanism 132 may be configured so as to only provide a single direction of rotation to the pinion gear 118. In such a configuration the positive rotational direction of the lever 130 results in translational motion of the carriage frame 120 with respect to the longitudinal section 104 of the spine 102. In this manner the ratcheting mechanism 132 may allow for free motion in an opposing direction so the ratcheting mechanism 132 operates without the need of repetitive actuation of the ratchet lever 136 by the user. In this configuration, the ratchet lever 136 may operate as a release lever which may be depressed, thus disengaging the ratcheting mechanism 132, and allowing the carriage frame 120 to be slid in a desired direction in order to disengage the drill 108 from the workpiece. The ratcheting mechanism 132 may be configured such that the carriage frame 120 may be either pushed or pulled in either direction along the longitudinal section 104 of the spine 102.

It should also be appreciated that the lever 130 may be provided with a lever handle 138. The length of the lever handle 138 may be increased or decreased so as to achieve a desired leverage, which may increase or decrease the amount of pressure that may be applied between the drill 108 and the workpiece by an application of a force to the lever handle 138 by the user.

In addition, the workpiece connection interface 124 may be provided as various surfaces or clamps. These various surfaces or clamps may be interchangeable and replaceable such that various types of workpieces may be drilled or the various surfaces or clamps may be replaced when worn. As shown best in FIGS. 4 and 6, this may be accomplished using bolts 103 or other equivalent fastening means. It should also be appreciated that the spine 102 and the carriage frame 120 may themselves work as a clamp. In this manner a user may grasp the drill body (not shown in its totality) in one hand, and grasp carriage frame 120 or spine 102 in the other hand. The drill bit tip is positioned where desired on a workpiece. Then the carriage frame 120 is slid into contact with an opposing side of the workpiece. The lever 130 and associated ratcheting mechanism 132 may then be used to apply pressure to the workpiece, thereby forcing the drill bit into the workpiece as the drill is actuated. Depending upon the thickness of the workpiece, the lever 130 and ratcheting mechanism 132 may be actuated one or more times as the drill bit works its way into and through the workpiece.

Similarly, the geared rack 116, pinion gear 118, and roller wheels 122A, 122B may be removably disposed in the carriage frame 120 such that they may be replaced after repeated use and associated wear. Wear of these components may introduce a degree of twisting freedom and or restricted motion between the carriage frame 120 and the spine 102.

Figure 6:
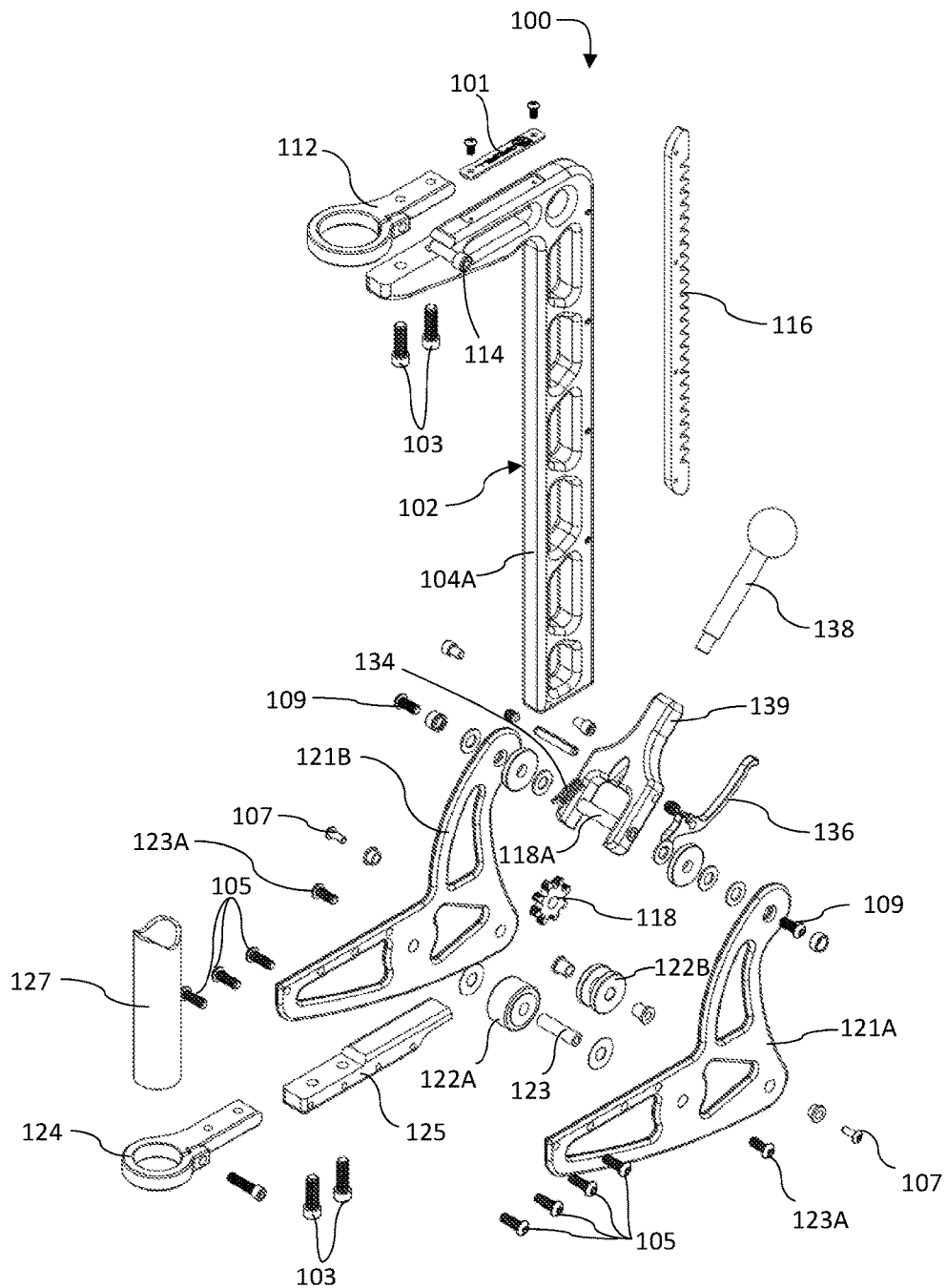
FIG. 6 is an exploded view of a portable handheld drill press

FIG. 6 illustrates an exploded view of one embodiment, disclosing how a portable drill press 100 may be assembled or disassembled. As shown, geared rack 116 may be removably coupled to the spine 102 such that it may be replaced when needed. Further, drill connection interface 112 is also removably coupled to the spine 102 using bolts 103 or an equivalent fastening means. The spine 102 may also provide for branding plate 101. The carriage frame 120 may be comprised of outer side portions 121A and 121B. Outer side portions 121A and 121B are connected or otherwise coupled to each other using a plurality of fastening means, such as bolts 105, rivets, or their equivalent. Bolts 105 pass through apertures in outer side portions 121A and 121B to engage workpiece plate 125. Workpiece plate 125 may then be coupled to workpiece connection interface 124 using bolts 103 or equivalent. In one embodiment, workpiece column 127 may be clamped in workpiece connection interface 124 for receiving a drill bit as it passes through a workpiece. This is ideal when the workpiece interface 124 cannot make contact with a surface due to space constraints. For example, a user may desire to drill a hole in an I-beam, which would prohibit workpiece connection interface 124 from coming into contact with the inner portion of the I-beam. As such, a user may clamp column 127 to the workpiece connection interface 124, which would then allow the column 127 to contact the workpiece (e.g., the I-beam or other workpiece). This ensures accurate drilling by maintaining leverage and guidance of the drill 108. Further, wheel 122A is coupled to axle 123, allowing it to rotate on surface 104A. Wheel 122A is operably connected to the carriage frame 120 using bolts 123A, rivets, or their equivalent. Wheel 122B, as shown, preferably has an inner groove for receiving the teeth of geared rack 116. This allows the wheel 122B to securely and smoothly roll up and down the exposed exterior of longitudinal section 104 without interfering with, or otherwise damaging, the geared rack 116. It further acts as a guide, keeping the carriage frame from twisting or otherwise moving in undesired ways. Wheel 122B may be operably connected to the carriage frame 120 using rivets 107, bolts, or any other equivalents. Pinion gear 118 fits over rod or axle 118A in handle base 139. Bolts 109, along with a plurality of washers and their equivalents couple the handle base 139 and ratcheting mechanism, which includes the spring 134, release lever 136, handle base 139, handle lever 138 and other associated parts in working connection with the spine 102 and gear rack 116. It will be appreciated that while not every washer, rivet, bolt, or rod may be labeled in FIG. 6, those having skill in the art will clearly understand how the portable drill press 100 is manufactured and assembled/disassembled.

Figure 7:
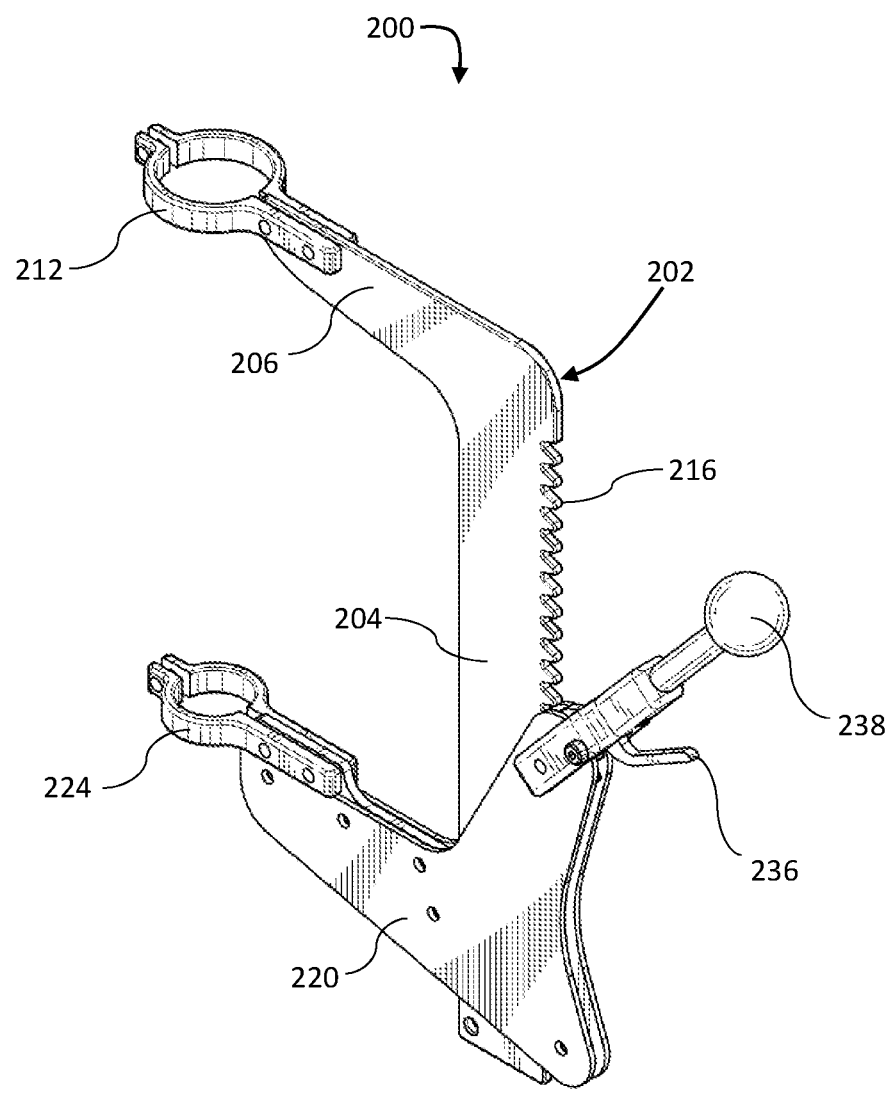
FIG. 7 is a perspective view of another embodiment of a portable handheld drill press

FIG. 7 shows another embodiment wherein the portable drill press 200 has a spine 202 with a geared rack 216 manufactured as one integral piece; i.e., the geared rack 216 is not removable from the spine 202, but is rather formed directly from spine 202. Like previous embodiments, spine 202 has transverse section 206 and longitudinal section 204. Carriage frame 220 is slidable thereon using lever handle 238 and ratchet lever 236 as part of a ratcheting system. Drill connection interface 212 is both circumference-adjustable as well as removable from spine 202 by using bolts, screws, or their equivalents. Likewise, workpiece connection interface 224 is circumference-adjustable as well as removable using the same means.

The present system thus provides a portable handheld drill press that can be used very quickly and accurately by workers in the field. The press can be easily and removably coupled to a variety of supports, including workbenches, work trucks, other vehicles, etc.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A handheld drill press device, comprising:
    a spine, wherein the spine comprises a longitudinal section having a geared rack located thereon and a transverse section configured to receive a handheld drill, the spine being of single manufacture such that the transverse section is immovable in relation to the longitudinal section;
    a carriage frame slidably coupled to the spine and having a workpiece connection interface located about a distal end of the carriage frame, wherein the carriage frame comprises a first outer side portion coupled to a second outer side portion, a workpiece plate coupled to, and interposing, the first and second outer side portions, and a workpiece column coupled to the workpiece connection interface;
    a gear rotatably interposed between the first and second outer side portions of the carriage frame and operable to mesh with the geared rack;
    a lever handle configured to provide a torque to the gear and thereby move the carriage frame with respect to the spine, the lever handle comprising a spring coupled to a release lever, wherein when the spring is extended, a first end of the release lever engages the gear to prohibit movement of the gear in at least a first direction and wherein when a second end of the release lever is actuated, compressing the spring, the first end of the release lever disengages the gear allowing bi-directional movement of the gear; and
    wherein the carriage frame further comprises a first roller wheel and a second roller wheel disposed on opposing sides of the spine, wherein the first roller wheel comprises a channel for passing over and receiving the geared rack.

2. The handheld drill press of claim 1, wherein the geared rack is removably coupled to the spine.

3. The handheld drill press of claim 1, wherein the geared rack is formed from, and part of, the spine.

4. A portable handheld drill press device, comprising:
    a spine having a longitudinal section and a transverse section, the spine being of single manufacture such that the transverse section is immovable in relation to the longitudinal section;
    a drill connection interface being removably coupled to a distal end of the transverse section of the spine, the drill connection interface being configured to receive a drill end of a handheld drill;
    a removably attachable rack having a plurality of geared teeth coupled to an exterior surface of the longitudinal section of the spine, the exterior surface being located on an opposing side of the spine from the transverse section;
    a carriage frame movably coupled to and circumventing the longitudinal section of the spine wherein the carriage frame comprises a first outer side portion coupled to a second outer side portion, a workpiece plate coupled to, and interposing, the first and second outer side portions, and a workpiece column coupled to a workpiece connection interface;
    the workpiece connection interface being removably coupled to a distal end of the carriage frame, the workpiece connection interface being configured to receive a workpiece to be worked upon by the handheld drill;
    a gear coupled to the carriage frame having a plurality of gear teeth being configured to mesh with the plurality of geared teeth of the rack;
    a lever handle being rotatably coupled to the carriage frame about the gear;
    a ratcheting mechanism coupled to the lever handle, the ratcheting mechanism comprising a spring coupled to the lever handle and a ratchet lever, wherein application of a force about an end of the lever handle causes the ratcheting mechanism to engage the gear thus causing the gear to rotate and therefore displace the carriage frame with respect to the spine and wherein actuating the ratchet lever compresses the spring and allows free rotation of the gear about the rack; and
    a first roller wheel and a second roller wheel coupled to the carriage frame and disposed on opposing sides of the spine, wherein the first roller wheel comprises a channel for passing over and receiving the geared teeth of the rack.

5. A method of using the handheld drill press of claim 4, wherein the method comprises:
    inserting the spine between the first and second roller wheels of the carriage frame;
    engaging the gear coupled to the carriage frame with the geared rack of the spine;
    coupling a drill to the drill connection interface of the transverse section;
    interposing a workpiece between the drill and the workpiece column;
    displacing the carriage frame along the spine until the workpiece abuts the drill and the workpiece column; and
    actuating the lever handle so that pressure is placed on the workpiece, allowing the drill to penetrate the workpiece and be received by the workpiece column.

* * * * *